Feb. 28, 1928.
E. POSTEL
1,660,356
EPICYCLIC CHANGE SPEED GEAR
Filed Nov. 25, 1927
Fig. I
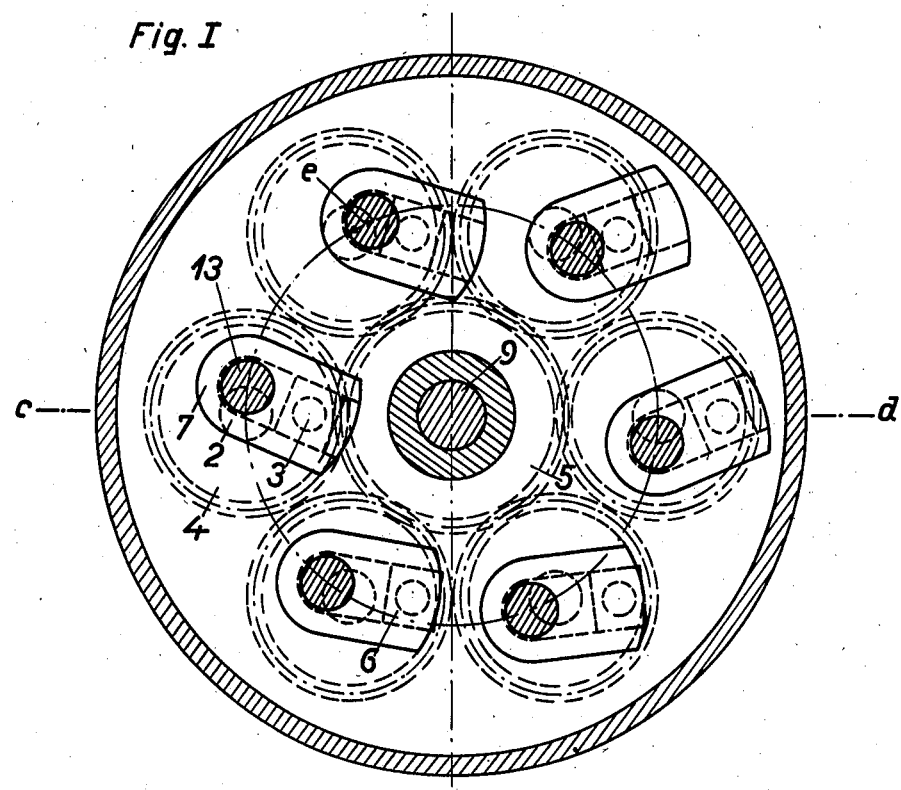
Fig. II
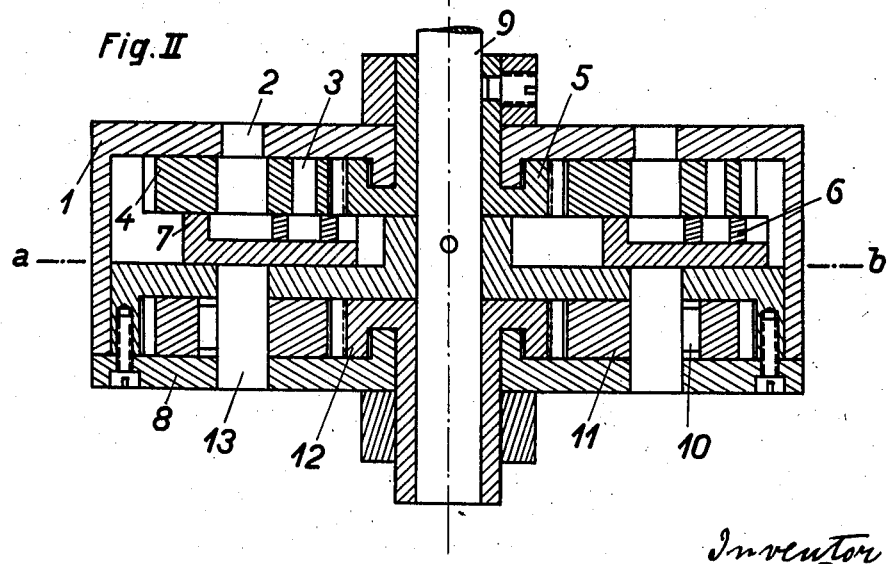
Inventor
Emil Postel
by
S. Sokal,
attorney.

Patented Feb. 28, 1928.

1,660,356

UNITED STATES PATENT OFFICE.

EMIL POSTEL, OF LUDWIGSHAFEN-ON-THE-RHINE, GERMANY.

EPICYCLIC CHANGE-SPEED GEAR.

Application filed November 25, 1927, Serial No. 235,644, and in Germany October 1, 1925.

The present invention consists in an epicyclic change speed gear in which by the employment of rotating crank and guide motions any speed of the driven member between zero and a maximum may be obtained without the necessity of exchanging any parts of the gear. The gear may be also constructed for reversing the direction of rotation of the driven member, and in the latter case any desired speeds may be produced between the maxima of forward and reverse drive.

There are known epicyclic change speed gears in which various ratios of transmission may be obtained by employing in a somewhat similar manner as in the present invention, two or more associated sets of planet wheels arranged upon a common shaft. In these known constructions however, the number of attainable ratios is always limited, moreover, considerable wear and unpleasant noise are caused by the sudden throwing in and out of the particular ratios of transmission.

The object of the present invention is to provide a gear free from these drawbacks which enables any desired ratio of transmission lying between zero and a maximum to be obtained by a gradual change. Another object of the invention is to provide a gear of this kind in which all the elements of the gear remain permanently in engagement and in which changes in the ratio of transmission may be effected rapidly and yet without any shock or noise. The improved gear has a very high degree of efficiency and is therefore suitable for motor cars.

These objects are according to the invention attained by connecting the planet wheels of two rotating planet wheel sets, by means of rotating crank and guide motions usually known under the name of Whitworth's gears. The axes of the shafts of the guides and the cranks are adapted to be moved relatively to each other in the peripheral direction for the purpose of changing the ratio of transmission. The crank shafts associated with the first set of planet wheels rotate with uniform speed, whilst the corresponding guide shafts of the second set of planet wheels are driven with a non-uniform speed through the said crank and guide motions. The retardations of speed occurring during each revolution of the guide shafts, are transmitted by the aid of free wheel clutches upon the corresponding planet wheels. The gear wheels employed may be single or multiple helical gears so that all the advantages resulting from the employment of helical gearing may be realized.

The accompanying drawings show by way of example one construction embodying the features of the invention.

Fig. 1 is a sectional elevation on line $a$—$b$ of Fig. 2 showing a gearing having twelve planet wheels and six crank and guide motions.

Fig. 2 is a section on line $c$—$d$ of Fig. 1. 1 designates a casing which is rotated with uniform speed and carries upon pivots 2 fixedly mounted in said casing, planet wheels 4, each of which is provided with a crank pin 3. The axes of the crank discs are as may be seen from Fig. 1 parallel to each other. The planet wheels 4 roll upon a stationary sun wheel 5. The crank pins 3 are provided with crank blocks 6 which engage grooves of the crank guides 7. The crank guides are rotatably mounted in a second casing 8 which is fixed to the casing 1 to rotate therewith, but is capable of angular adjustment relatively to the casing 1, both casings being mounted upon a common shaft 9. Any suitable means for instance a hand lever, may be employed for adjusting the casing 8 relatively to the casing 1. The shafts 13 of the crank guides 7 carry free wheel clutches 10 upon which are rotatably mounted planet wheels 11. The latter wheels roll upon a sun wheel 12 which is adapted to rotate freely upon the shaft 9.

The operation of the gear is as follows:—

Upon the casings 1 and 8 being adjusted for instance by means of a hand lever, in such a manner as to cause the axis of the crank guide shaft 13 to coincide with the axis of the corresponding crank shaft 2, during uniform rotation of the casings 1 and 8 the planet wheels 4 will roll upon the stationary sun wheel 5 and their rotary movement will be uniformly transmitted to the corresponding planet wheels 11. The latter will therefore roll upon their sun wheel 12, and assuming that the wheels 11 and 4 are of the same diameter, the sun wheel 12 will remain stationary the same as the sun wheel 5. If now the casing 8 be displaced angularly with regard to the casing 1 about the shaft 9, the axes of the shafts 13 and 2 will be moved apart and consequently, the crank guide motions interposed between the shafts 13 and 2 will become operative. The crank guide shaft 13 will then receive rotary movement from the corresponding crank shaft 2, the rotary movement being as is well known, of a non-uniform kind, part of the rotation of the shaft 13 taking place with an accelerated and the other part with a retarded speed. A planet wheel 11 whose shaft turns with a retarded speed, cannot maintain its uniform speed of rotation as it is incapable of over-running the shaft 11 upon which it is mounted. The planet wheel 11 being connected to its shaft by a free wheel clutch is therefore compelled to assume the same retarded speed of rotation. The result is that the sun wheel 12 which has hitherto been stationary, will be carried in the direction of rotation of the casings 1 and 8 by the planet wheel in question during a period corresponding to the rolling of one-sixth of the periphery of the planet wheel upon the sun wheel. This period corresponds to the maximum retardation of the planet wheel 11 relatively to its corresponding planet wheel 4. The same operation is repeated successively in connection with each following planet wheel, so that whilst any of the six planet wheels 11 transmits the drive upon the sun wheel 12, the remaining planet wheels 11 revolve freely upon their shafts without transmitting movement. It will thus be seen that the planet wheels 11 drive a sun wheel one after the other and thus impart to the wheel 12 uniform rotation in one direction, the speed of which depends upon the eccentricity "$e$" of the shafts 2 and 13 produced by the shifting of the casing 8 with regard to the casing 1. The ratio of transmission may therefore be gradually changed from zero to a maximum.

The gear may be adapted for reversing the direction of rotation of the sun wheel 12, by employing planet wheels 11 of a larger diameter than that of the wheels 4.

In the above described gear the driving action of the crank guide shafts 13 is due to the retardation of said shafts, it will therefore be understood that instead of the retardation of the shafts the acceleration of the shafts could equally well be employed for producing the driving action. It should also be borne in mind that in that case the diameter of the planet wheels 11 must be chosen smaller than that of the wheels 4 for the purpose of reversing the direction of rotation.

I claim—

1. An epicyclic change speed gear comprising in combination: a stationary sun wheel; a set of planet wheels associated therewith; a casing carrying said set of planet wheels; a second sun wheel capable of rotation; a set of planet wheels associated with said second sun wheel; a casing carrying said second set of planet wheels; and means for transmitting rotation from the planet wheels of the first set to the planet wheels of the second set, said means comprising crank guide motions of adjustable eccentricity and free wheel clutches.

2. An epicyclic change speed gear comprising in combination: a stationary sun wheel; a set of planet wheels associated therewith; a casing carrying said set of planet wheels; a second sun wheel capable of rotation; a set of planet wheels associated with said second sun wheel; a casing carrying said second set of planet wheels; and means interposed between corresponding planet wheels of the said two sets for transmitting non-uniformly rotation of the wheels of the first set to the wheels of the second set in one direction only.

3. An epicyclic change speed gear comprising in combination: a shaft; a stationary sun wheel; a second sun wheel rotatable on said shaft; a casing mounted on said shaft to rotate therewith; a set of planet wheels associated with the said stationary sun wheel and carried by said casing; a second set of planet wheels associated with the second sun wheel and carried by said casing; crank and slot motions for non-uniform transmission of rotation from the planet wheels of one set to the planet wheels of the other set; free wheel clutches interposed between the said crank and slot motions and the planet wheels of one set; and means for adjusting the eccentricity of the said crank and slot motions by angular displacement of one set of planet wheels relatively to the other set.

Signed at Frankfort-on-the-Main, Germany, this 10th day of November, 1927.

EMIL POSTEL.